United States Patent [19]

Hellman

[11] 3,995,844
[45] Dec. 7, 1976

[54] CARVING BOARD
[75] Inventor: Werner Hellman, Baraboo, Wis.
[73] Assignee: Flambeau Products Corporation, Baraboo, Wis.
[22] Filed: Feb. 26, 1976
[21] Appl. No.: 661,538

Related U.S. Application Data
[63] Continuation of Ser. No. 576,982, May 13, 1975, abandoned.

[52] U.S. Cl. ............................................ 269/54.5
[51] Int. Cl.² ......................................... B23Q 1/00
[58] Field of Search ................... 269/53, 54.4, 54.5

[56] References Cited
UNITED STATES PATENTS
2,751,951   6/1956   Strathaus ........................ 269/54.5
3,030,994   4/1962   Wysowski ........................ 269/54.5

FOREIGN PATENTS OR APPLICATIONS
529,268   11/1940   United Kingdom ............ 269/54.5
652,028    4/1951   United Kingdom ............ 269/54.5
381,987   10/1931   United Kingdom ............ 269/54.5
 15,140    9/1891   United Kingdom ............ 269/54.5
169,215    9/1921   United Kingdom ............ 269/54.5

Primary Examiner—Al Lawrence Smith
Assistant Examiner—Robert C. Watson
Attorney, Agent, or Firm—Allegretti, Newitt, Witcoff & McAndrews

[57] ABSTRACT

The improved, plastic carving board disclosed herein is for cutting foods and the like. The carving board includes an upper, flat cutting surface that has an annular recess therein. A metal spike-ring, having a plurality of upstanding spikes, is disposed in the annular recess so that the upper ends of the upstanding spikes may engage and hold the food and the like being cut. The spike-ring may be selectively removed from the annular recess to facilitate the cleaning of the spike-ring and the carving board and may be rotated within and with respect to the annular recess to facilitate cutting.

2 Claims, 2 Drawing Figures

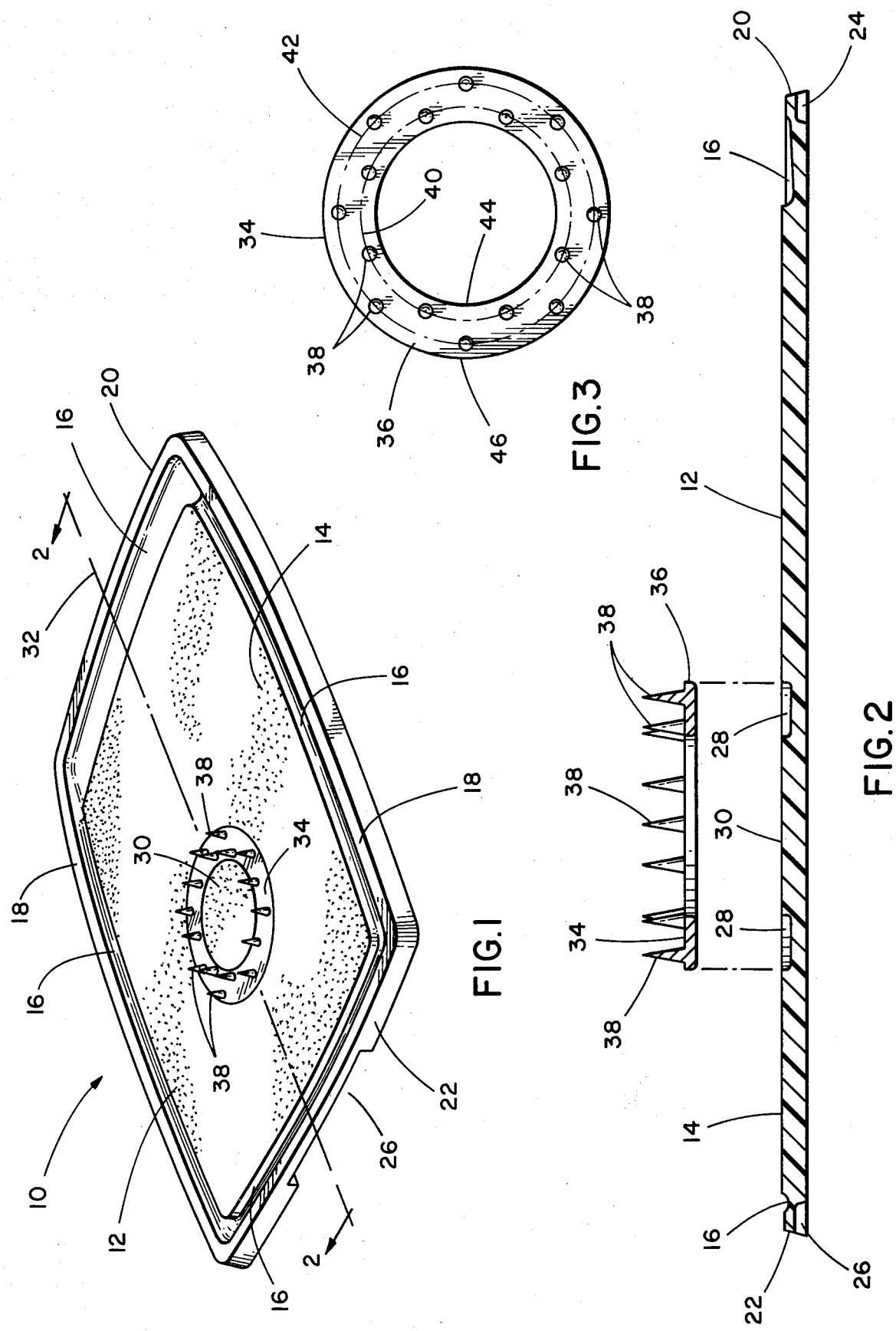

CARVING BOARD

This application is a continuation of applicant's parent application Ser. No. 576,982, filed May 13, 1975, now abandoned.

BACKGROUND AND SUMMARY OF THE INVENTION

This invention relates to carving boards, and more particularly, to improved carving boards for cutting foods and the like.

In the past, carving boards for foods and the like have generally been made of wood. To facilitate the cutting of the food and the like, the prior wooden carving boards have sometimes included a plurality of spikes extending upwardly from the cutting surface. These upstanding spikes have generally been permanently affixed to the carving boards either by having their lower ends embedded in the cutting surface or by mounting the spikes on a bracket which is, itself, attached permanently to the cutting surface of the carving board. While the prior wooden carving blocks certainly performed their intended function adequately, it was often difficult to clean all the food particles from around the bases of the spikes, and the blood, juices and the like from the food being cut often became absorbed in the wood. Unsanitary conditions sometimes resulted from the residual and absorbed food.

It is a primary object of the present invention to provide an improved carving board including a spike-ring which may be selectively and easily removed from an annular recess in the carving board so as to facilitate cleaning of the spike-ring and the board and which may be moved with respect to the cutting surface so as to facilitate the cutting of the food or the like on the carving board. More specifically, the improved carving board of my present invention comprises a body having a base and an upper, substantially flat cutting surface. An annular recess is formed in the cutting surface. A spike-ring is disposed in this annular recess with the dimensions of the spike-ring and the annular recess being selected so that while the spike-ring may be easily inserted into and removed from the annular recess and moved with respect to the cutting surface, the spike-ring cannot be readily dislodged from the annular recess during the cutting of foods and the like on the cutting surface.

The body of my improved carving board is made from a hard, non-absorbent plastic material that is resistant to cutting by the knives used for cutting food and the like. The spike-ring is made from metal and includes a flat annular member which includes a plurality of upstanding spikes projecting from the annular member in one direction. The spikes are arranged on the annular member in inner and outer concentric circles, with the spikes in the inner circle being angularly equi-spaced from each other and with the spikes in the outer circle being angularly equi-spaced from each other and from the spikes in the inner circle.

These and other objects, advantages and features of my present invention will become apparent in the following description of the preferred embodiment of my present invention.

DESCRIPTION OF THE DRAWINGS

FIG. 1 is a perspective view of an improved carving board of my present invention.

FIG. 2 is a cross-sectional view taken along the line 2—2 in FIG. 1 and showing the spike-ring utilized in the improved carving board of FIG. 1 in an exploded position.

FIG. 3 is a plan view of the spike-ring utilized in the improved carving board of FIG. 1.

Throughout the various figures of the drawings, the same reference numerals will be used to designate the same parts or components. Moreover, when the terms "right", "left", "right end", "left end", "inner", "outer", "upper" and "lower" are used herein, it is to be understood that these terms have reference to the structure shown in the drawing as it would appear to a person viewing the drawing.

DESCRIPTION OF THE PREFERRED EMBODIMENT

Referring now to the drawings, an improved cutting board embodying the principles of my present invention is shown generally at 10. The cutting board 10 comprises a body 12 which has a generally rectangular configuration and which is molded from a non-absorbent plastic material.

The body 12 includes a generally rectangular first, upper surface 14 which serves as the cutting surface for the carving board. The first or cutting surface 14 has a texturized pattern engraved thereon which provides an attractive appearance and which assists in preventing food being cut on the cutting surface 14 from sliding on the surface 14. The body 12 also includes a second, upper surface 16 which is disposed about the cutting surface 14 and which is spaced slightly below the cutting surface 14. The second upper surface 16 may be utilized to catch the juices and the like from the food being cut on the cutting surface 14 and to retain or hold the juices away from the cutting surface 14.

The body 12 has a lower, flat surface 18 which is generally parallel to the cutting surface 14, and which serves to support and steady the body 12 during cutting operations. Central portions of the right end 20 and the left end 22 of the body 12 are undercut or cut away, as indicted generally at 24 and 26, respectively, to define handles. These handles 24 and 26 facilitate carrying the carving board 10.

An upwardly open annular recess 28 is formed in the cutting surface 14. The center 30 of the annular recess 28 is disposed on the longitudinal central line 32 of the body 12 and is spaced approximately one-third to one-half of the distance from the left end 22 to the right end 20 of the body 12.

A spike-ring 34 is disposed or positioned in the annular recess 28 and may be made from metal. As best shown in the FIGS. 2 and 3, the spike-ring 34 includes a first flat, annular member 36 that has 16 integral, upstanding spikes 38 formed thereon. When the spike-ring 34 is disposed in the annular recess 28, the upper ends of the spikes 38 project upwardly above the first cutting surface 14 a sufficient distance so as to be able to impale or hold the food or the like being cut on the carving board 10. As best shown in FIG. 3, the spikes 38 are arranged on the first member 36 so as to define inner and outer, concentric circles, as generally indicated at 40 and 42, respectively. The circles 40 and 42 are radially equi-spaced from the radial inner and outer edges 44 and 46, respectively, of the first member 36 and from each other. The eight spikes 38 which are disposed along the circumference of the inner circle 40 are angularly equi-spaced from each other at an angle of 45°. The eight spikes 38 which are disposed along the outer circle 42 are similarly angularly equi-spaced from each other at an angle of 45° and are angularly equi-spaced from the spikes 38 in the inner circle 40 at an angle of 22.5°.

The respective dimensions of the annular recess 28 and the first member 36 of the spike-ring 34 are such that the spike-ring 34 may be easily and readily removed from the annular recess 28 to facilitate the cleaning of both the annular recess 28 and the spike-ring 34. The thickness of the first member 36 in the vertical direction (i.e. in the direction perpendicular to the plane of the first cutting surface 14) is selected so as to be substantially identical to the depth of the annular recess 28, and this relationship between the thickness of the first member 36 and the depth of the annular recess 28 to a large extent prevents any accidental dislodgement of the spike-ring 34 from the annular recess 28 during the cutting of foods and the like on the cutting board 10.

An embodiment of my improved carving board has been manufactured and has proved quite satisfactory in actual usage. In this carving board, the dimensions of the body 12 are approximately 16 inches in length, 12 inches in width and 5/16 inches in thickness. The inner and outer diametrical dimensions of the annular recess 28 are 2.500 inches and 4.030 inches, respectively, and the annular recess has a depth of 0.160 inches. The inner and outer diametrical dimensions of the first member 36 of the spike-ring 34 are 2.531 and 4.000 inches, respectively, and the first member 36 has a thickness of 0.145 inches. The height of the spikes from the upper surface of the first member 36 is approximately ⅝ inches. The body 12 was molded from a mixture of linear polyethylene and polypropylene, and the spike-ring 34 was made from nickel plated zinc.

In view of the foregoing, it should be apparent to those having skill in this art that my invention provides an improved carving board which is easy to use and which permits facile cleaning of both the spike-ring 34 and the body 12. As a result of the use of plastic and metal to make the body 12 and the spike ring 34, respectively, the carving board 10 may be cleaned easily with soap and water, and there is no danger that juices or the like from the food being cut on the board will soak into the board and thus cause an unsanitary condition.

It should also be obvious to those having skill in this art that modifications may be made to my carving board 10. For example, the position and configuration of the handles 24 and 26 could be changed, and of course, the board 10 could have a configuration other than rectangular. Similarly, the arrangement, number and disposition of the spikes 38 on the first member 36 could be changed, and the spikes 28 need not be integrally formed with the first member 36.

Thus, since the invention disclosed herein may be embodied in other specific forms without departing from the spirit or central characteristics thereof, the preferred embodiment described herein is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

I claim:
1. An improved spike-ring carving board for holding and cutting foods and the like comprising: a one piece board made of a hard, non-absorbent plastic material, the board having a first, flat upper surface that is adapted to serve as a cutting surface for food and the like, and also having a flat base surface that serves to support and steady the first upper surface during cutting; the first upper surface having a texturized pattern engraved thereon that assists in preventing food being cut on the first upper surface from sliding on and with respect to the first upper surface and that is resistant to cutting by knives and the like, and also having an upwardly open, annular recess formed therein, with the annular recess having a preselected inner radial dimension, a preselected outer radial dimension and with the bottom of the annular recess being disposed below the first, upper surface of the board a preselected depth and being closed so as to prevent any fluid leakage from the annular recess to the flat base surface; an annular spike-ring disposed in the annular recess and including a base portion having upper and lower surfaces, the base portion of the spike-ring having an inner radial dimension substantially equal to the preselected inner radial dimension of the annular recess, having an outer radial dimension substantially equal to the preselected outer radial dimension of the annular recess and having a thickness, as measured between its upper and lower surfaces, substantially equal to the preselected depth of the annular recess so that when the spike-ring is disposed in the annular recess, the base portion of the spike-ring substantially fills the annular recess and the upper surface of the base portion of the spike-ring is substantially parallel to and coplanar with the first upper surface of the board; first and second sets of upstanding spikes, each of the upstanding spikes having a lower end that is mounted on the upper surface of the base portion of the spike-ring, and an upper pointed end that projects upwardly above the first surface of the board when the spike-ring is disposed in the annular recess and that is adapted to engage and hold the food and the like to be cut; the first set of upstanding spikes being arranged on the spike-ring in a first circle about the center of the spike-ring, the second set of the upstanding spikes being arranged on the spike-ring in a second circle, with the first circle being disposed radially inwardly from the second circle, with the upstanding spikes in the first set of upstanding spikes being angularly equi-spaced from each other and with the upstanding spikes in the second set of spikes being angularly equi-spaced from each other and being angularly equi-spaced from the upstanding spikes in the first set of upstanding spikes.

2. The improved carving board described in claim 1 wherein the board includes a second upper surface which extends around the first upper surface and which is disposed slightly below the first upper surface so as to catch the juices and the like from the food being cut; wherein the upstanding spikes are integrally formed with the base portion of the spike-ring; and wherein the spike-ring, together with the spikes, may be selectively and easily removed from the annular recess as a unit for cleaning.

* * * * *